Dec. 1, 1942.  H. W. JONES  2,303,473
CUTTING OR WELDING AND HEAT-TREATING APPARATUS
Original Filed March 30, 1939
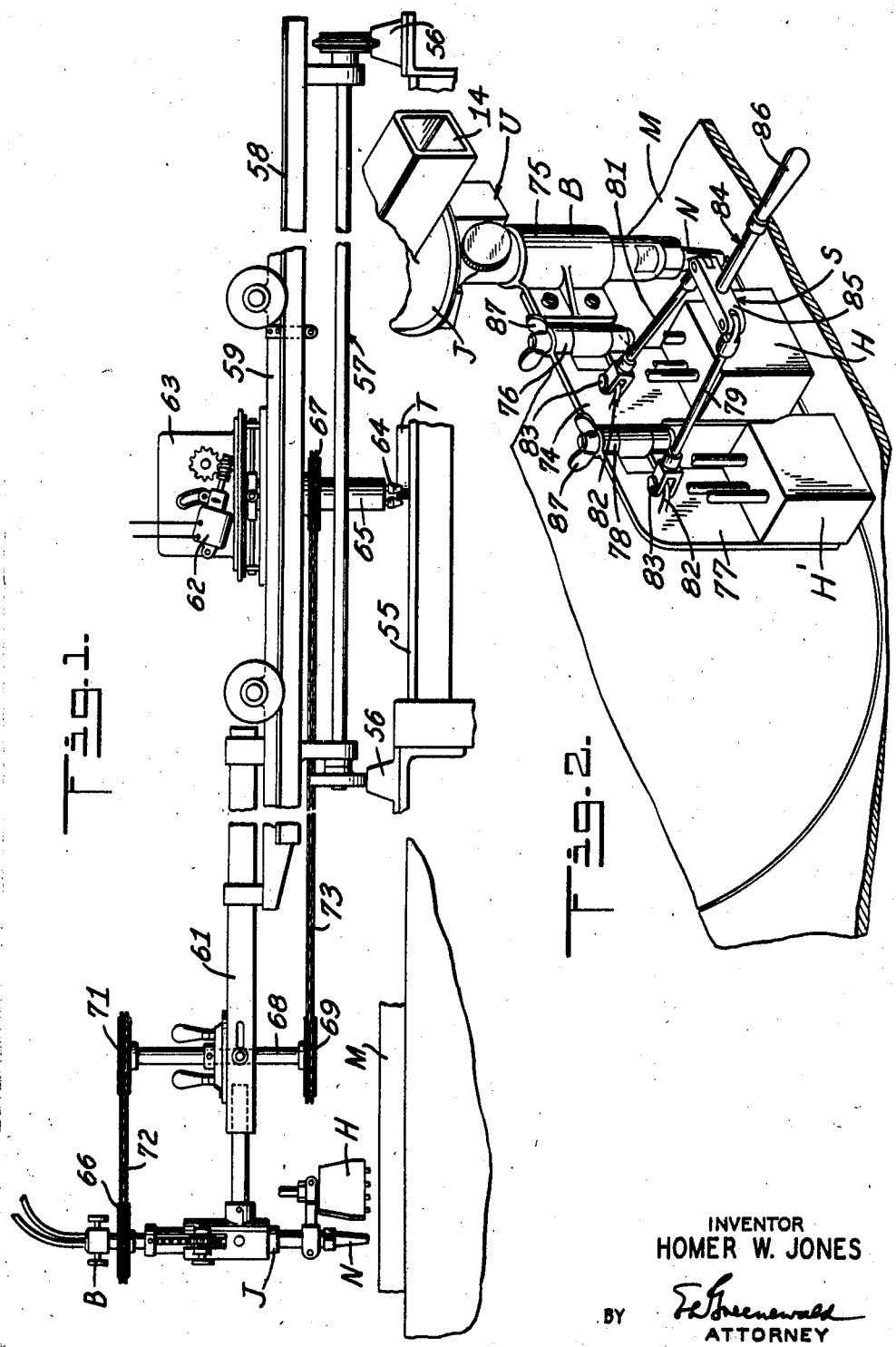
INVENTOR
HOMER W. JONES
BY
ATTORNEY Patented Dec. 1, 1942

2,303,473

UNITED STATES PATENT OFFICE 2,303,473

CUTTING OR WELDING AND HEAT-TREATING APPARATUS

Homer W. Jones, Westfield, N. J., assignor to The Linde Air Products Company, a corporation of Ohio Original application March 30, 1939, Serial No. 264,918. Divided and this application July 15, 1941, Serial No. 402,453

9 Claims. (Cl. 266—5)

This invention relates to local heat-treatment, and more particularly to apparatus adapted to direct localized high-temperature heat against the surface of a metal body adjacent to the regions deleteriously affected by a welding, flame-cutting, or similar operation.

It is common procedure in flame-cutting or welding to direct a flame-cutting or welding jet against the surface of a ferrous metal body along a predetermined irregular path. The path to be followed is defined by an outline or a template of predetermined configuration which assists in manually or mechanically guiding the cutting or welding implement along the desired course. Unless the metal body operated upon is composed of mild or low carbon steel, the welding or cutting operation may induce hardening of the metal in the portions adjoining the path of travel as a result of the relatively rapid cooling from the high temperature produced by the welding or cutting operation.

Heretofore it has been customary to furnace-anneal metal bodies which had been hardened undesirably by such metallurgical operations, in order to restore the metal to a state of ductility that would allow the metal to be fabricated or used for structural purposes. Often such furnace treatment was uneconomical because of the excessive time and expense involved. Where large sections were being fabricated, annealing furnaces of the necessary size and shape were not always available. Furthermore, by the time the welding or cutting operation had been completed so that the body might be placed in a furnace, portions often had cooled substantially to room temperature so that the metal became permanently injured by the formation of surface checks and cracks. Localized high-temperature heat has been used to heat-treat portions of metal bodies hardened by a flame-cutting or welding operation, but no arrangement has been provided whereby localized reconditioning heat may be applied concurrently with a welding or cutting operation along a path of generally irregular configuration. For example, no provision has been made whereby a heat-treating head may follow along a kerf of generally irregular configuration at a point substantially separated from a cutting blowpipe so as to heat-treat the affected edges.

Accordingly, the principal objects of the present invention are to provide improved apparatus for welding or cutting a ferrous metal body and concurrently therewith heat-treating the portions metallurgically affected by the welding or cutting operation; to provide in such an apparatus means for manually shifting the position of the heat-treating means in accordance with the configuration of the path to be followed; to provide an improved cutting and heat-treating unit adapted to be connected to a conventional shape-cutting machine; to provide means for automatically maintaining a heat-treating head substantially adjacent to a generally irregular path of travel; to provide an improved apparatus for effecting successive heat treatments along a path of travel affected by a welding or flame-cutting operation; and to provide means substantially remote from the flames for shifting the heat-treating head transversely with respect to the line of travel. These and other objects of the invention will become apparent from the following description and the accompanying drawing disclosing embodiments of the present invention. In the drawing—

Fig. 1 is a side-elevational view of a reproducing machine illustrating a modified form of the invention wherein the position of the heating head is automatically regulated by the position of the template follower; and Fig. 2 is an isometric view of a simplified version of the present invention but wherein a plurality of heating heads are employed to perform successive heat treatments.

Generally speaking, the invention comprises one or more heating heads H spaced a substantial distance from a cutting or welding blowpipe B and adapted to project one or more sources of local high-temperature heat against successive zones along or adjacent to the line of travel of the cutting or welding blowpipe. The heating head H and the cutting or welding blowpipe B are supported for movement along a predetermined path over the surface of a metal body, being secured, for example, to the blowpipe-supporting arm of a conventional shape-cutting machine. Steering means S, permits the heating head H to be swivelled about a remotely positioned axis preferably the axis of the blowpipe B, whereby the heating head H may be adjustably positioned with respect to the path of travel. As shown in Fig. 1, the heating head H and blowpipe B may be adapted to rotate about the blowpipe axis within a hollow tubular journal J. The blowpipe B comprises any metallurgical tool capable of performing a welding, flame-cutting, or similar operation which is likely to induce hardening in the highly heated portions of the metal body during cooling. Although the blowpipe is herein disclosed as a machine-cutting blowpipe, that is, one intended for machine mounting, and being adapted to project preheating and oxidizing jets through a nozzle N against the metal body M, the blowpipe may otherwise comprise an arc welding electrode, a cutting electrode, a welding blowpipe, or any equivalent tool.

One form of the present apparatus is disclosed in Fig. 1 in connection with a shape-cutting machine of the type disclosed in Allison Patent No. 1,774,265, dated September 2, 1930. The supporting mechanism comprises a table 55 having a pair of longitudinally extending tracks 56 thereon. A lower carriage 57 is mounted for rolling movement on the tracks 56. A pair of transversely extending tracks 58 on the lower carriage 57 provide rolling support for an upper carriage 59. The upper carriage, which is thus free to move universally in a horizontal plane, supports a blowpipe arm 61 extending horizontally outward therefrom. A conventional cutting blowpipe or equivalent tool B is swively mounted within a journal J at the outer extremity of the arm 61. The upper carriage is propelled by a drive mechanism 62 comprising an electric motor and speed reduction gearing as shown, supported on and within a housing 63. The housing 63 is journalled with respect to the upper carriage 59 and thus may swivel about a central axis. Power from the drive mechanism 62 is transmitted to trunnions 64 adapted to engage a template T mounted on the table 55. As the trunnions rotate in opposite directions, the upper carriage and consequently the blow pipe B are propelled about a course corresponding with the path defined by the template T. The trunnions frictionally engage the sides and edges of the template so that a plane containing the trunnion axes is maintained perpendicular to the path of travel at all times. Accordingly, as the trunnions propel the carriage about the template, the housing 63 is maintained in constant angular relationship with respect to the template.

A tube 65 houses the trunnion drive shafts, and is secured to the housing 63 in such a manner as to rotate therewith. The heating head H, secured in spaced relation to the blowpipe B, may be revolved about the blowpipe axis in any convenient manner in response to the turning motion of the housing 63 to thereby coordinate automatically the rotary position of the housing 63 and the heating head H. One means for obtaining this result is illustrated more or less diagrammatically in Fig. 1, and comprises a sprocket 66 secured to the blowpipe B and a similar sprocket 67 secured to the tube 65. An intermediate vertical shaft 68 supports sprockets 69 and 71. Chains 72 and 73 join the respective sprockets as shown, so that the rotary position of the head H may be coordinated with respect to the movement of the housing 63 and trunnions 64. The heating head H thus automatically is maintained in substantially a uniform position with respect to the path of travel, being controlled by the turning motion imparted to the tube 65 and housing 63 by the engagement of the trunnions 64 with the template T.

In Fig. 2 is disclosed more or less diagrammatically a metallurgical tool such as a cutting or welding blowpipe B, which may be supported in any convenient manner for movement in any and varying directions with respect to the top surface of a metal body M, for example, on the upper carriage of a shape-cutting machine of the type shown in S. R. Oldham application Serial No. 161,085, filed August 26, 1937, now Patent No. 2,279,338 dated April 14, 1942. A pair of mutually separated heating heads H and H' are mounted in hinged relation to one another and to the blowpipe B so that either of the heads H may be shifted to any desired position with respect to the path of travel. Mounting means such as a plate 74 supports the heating head H and is pivotally secured to a clamp 75 on the blowpipe B by a hinge 76. Similarly, the heating head H' is supported by means of a plate 77 pivotally secured to the plate 74 by a hinge 78. Steering means S provides a manually operable control device for maintaining either or both of the heads H, H' in predetermined relation with respect to the path of travel. As shown in Fig. 2, the steering means S may comprise a pair of connecting rods 79 and 81 secured in articulated relation to the heads H and H' as by means of mounting lugs 82 and removable pins 83. The rods 79 and 81 are joined in pivotal relation at the outer extremity by a T-shaped member 84 comprising a pivotal link 85 and a handle portion 86. By manipulating the steering means S, either or both of the heads H may be manually guided so as to be maintained in predetermined relation to the path of travel. The heat capacity of the respective heads H and H' and the distance separating the respective parts is determined by the nature of the heat-treatment desired as will more fully hereinafter appear. Wing nuts 87 are threaded on the pintle of the respective hinges 76 and 78 for locking the hinges in predetermined position. For example, if the apparatus is to be employed in connection with straight line travel, or if the heating heads are to be automatically swivelled in the manner disclosed in Fig. 1, the steering means S may be temporarily removed from the heads H and H' by removing the pins 83 and the wing nuts 87 may be tightened to clamp the heads in predetermined angular position.

The nature of the treatment employed depends largely upon the specific metal under treatment. For the so-called quench-hardening grades, such as medium carbon plain steels, low carbon manganese-silicon steels, and the low carbon medium manganese structural steels, a mild preheat locally applied to the base metal immediately ahead of and concurrently with the gas cutting operation is effective in eliminating hardening tendencies of the metal during cooling. This result may be obtained, for example, by locating the multi-tip head H in advance of the nozzle N so that the zone adjoining the path of travel has sufficient heat soaked into the portions by the head H as to avoid a quenching action following the flame-cutting or other operation. The degree of preheat is not critical in most cases. With most quench hardening steels, satisfactory preheat is obtained when the successive zones in advance of the cutting or welding blowpipe are heated more or less uniformly throughout to a red heat.

Where the metal body is composed of mildly air-hardening steels such as high-manganese structural silicon steel, nickel structural steel, and high-carbon plain steel, preheating in the manner described is not sufficient to counteract excessive hardening, and resort must be made to post heat-treatment. In many cases, proper conditioning of the steel may be effected by locating the heating head H so as to direct localized high-temperature heat against the top surface adjoining the path of travel at a point spaced behind the blowpipe B so as to raise the temperature of the metal above the critical range to provide an annealing action. Where the steel employed is strictly of an air-hardening nature, that is, one in which the dissipation of heat into the adjoining atmosphere and the conduction of heat into the adjoining body of metal occur at such a rate as to induce the formation of hard constituents, such as acicular martensite, a post-annealing treatment is not entirely effective because the hard constituents often reoccur during cooling from the annealing temperature. In such a case, the advantages of the annealing treatment are more or less limited to a refinement of the grain, with partial relief of stresses and a moderate increase in the ductility.

In order to completely restore such metals to a point where they will pass the prescribed bend tests, it has been found advantageous to apply a localized tempering heat instead of, or in addition to, the annealing flames. The former may be accomplished by locating the heating head H disclosed in Fig. 1 so as to reheat the portions adjacent to the path of travel, for example, the line of cut, to a point just below the critical range. It has been found advantageous to provide a space between the nozzle N and the heating head H of from two to five inches, according to operating conditions, so that the metal may first partially cool from the cutting or welding operation, that is, to a range preferably below 900° F. The capacity of the heating head is such as to then raise the temperature of the partially cooled portions to a point just below the critical range to effect a tempering treatment. Such a localized tempering operation has been found effective for drawing the hardness, increasing the ductility, relieving stresses or modifying the hard constituents.

The heads H, H' shown in Fig. 2 may be employed as tandem preheating heads to obtain a more thorough preheating action than is obtainable with a single head, that is, by causing the respective heads to pass successively over the path of travel in advance of the blowpipe B. Otherwise, the respective heads H and H' may be made to follow at successive distances behind the blowpipe B in which case the head H may raise the temperature of the metal to above the critical range to obtain an annealing action, and the head H' may be employed simply to delay the cooling and thereby augment the annealing action. Otherwise, use may be made of the respective heads to combine the advantages of an annealing operation and a tempering treatment by arranging the heating capacity of the head H to perform an annealing operation while the head H' is adapted to function as a tempering head. Accordingly, the affected portions, after partial cooling, first are annealed by the action of the head H, resulting in a refinement of the grain and a partial reduction in the hardness. Although air-hardening steel thus treated hardens again on cooling from the annealing operation, the degree of hardness is moderated considerably because of the fact that the metal cools from a lower temperature. Cooling from the annealing temperature produces a less drastic action than cooling from the melting point of the metal such as occurs after the welding or cutting operation. Sufficient space is provided between the heads H and H' so that the metal annealed by the head H may cool to a point well below the critical range, after which the head H' may raise the temperature to a point just below the critical range to temper the metal and restore normal ductility. Tempering draws the hardness and otherwise treats the metal so as to restore it to a condition rendering it suitable for subsequent use.

As an example of typical operation, a head H may be attached to the arm of a shape-cutting machine of the type shown in Fig. 1. With a suitable blowpipe B located over a metal body, the usual template-following head is engaged with the template to propel the blowpipe along the desired course. Where no automatic means is provided for shifting the heating head H, the operator controls its position with the aid of the steering means, S, so as to maintain the head H along or adjacent to the line of travel. Ordinarily the path to be followed is clearly defined by the cutting or welding operation and the operator has no difficulty in maintaining the head H in proper alignment. When the apparatus is employed for preheating in conjunction with flame-cutting, the proper position for the head H may be determined directly from observation of the template and follower. In other cases as where the direction of movement of the blowpipe support is controlled manually by the operator from a position adjacent to the blowpipe, the path of travel is ordinarily clearly defined by a chalk-line formed directly on the workpiece, thus indicating the proper position for the preheating head H at all times.

Various modifications of the herein described apparatus may be made without departing from the scope of the invention or sacrificing any of its advantages.

This application is a division of application Serial No. 264,918, filed March 30, 1939, now Patent No. 2,253,377.

I claim:

1. A tandem heat-treating apparatus for reconditioning the metallurgical structure of ferrous metal along an irregular path deleteriously affected by the blowpipe of a shape-cutting or welding machine, comprising a plurality of heating heads; mounting means for securing said heads to said machine at successively greater distances from said blowpipe; and means for shifting said respective heads laterally relatively to said irregular path to maintain said heads in tandem relation on said path.

2. A tandem heat-treating apparatus for reconditioning the metallurgical structure of ferrous metal along an irregular path on the surface thereof traversed and deleteriously affected by the blowpipe of a shape-cutting or welding machine, comprising a plurality of spaced heating heads; hinge-means pivotally connecting said respective heads for arcuate movement of each head relative to the adjoining head about an axis normal to said surface; and mounting means for securing said heads to said machine in adjoining relation to said surface and at successively greater distances from said blowpipe, said head nearest said blowpipe being supported for arcuate movement relatively to said blowpipe.

3. An apparatus as claimed in claim 2 including means for locking said heads in predetermined position relatively to one another.

4. A tandem heat-treating apparatus for reconditioning the metallurgical structure of ferrous metal along an irregular path on the surface thereof traversed and deleteriously affected by the blowpipe of a shape-cutting or welding machine, comprising a plurality of spaced heating heads; hinge-means pivotally connecting said respective heads for arcuate movement of each head relative to the adjoining head about an axis normal to said surface; mounting means for securing said heads to said machine in adjoining relation to said surface and at successively greater distances from said blowpipe, said mounting means supporting said head nearest said blowpipe for arcuate movement relatively to said blowpipe; and steering means operable on said respective heads to maintain said heads in predetermined tandem relation along said irregular path.

5. An apparatus as claimed in claim 4, wherein said steering means comprises rods pivotally extending from said respective heads, and a handle member pivotally joining said rods.

6. Apparatus for progressively welding or cutting a ferrous metal body along an irregular path and concurrently heat-treating the portions affected by the welding or cutting operation, comprising blowpipe means for projecting a welding or flame-cutting jet against and progressively along said path on the surface of said metal body; a plurality of spaced heating heads located so as direct local high-temperature heat at successive separated zones on said surface; and means for separately shifting said heads relatively to one another laterally with respect to said irregular path, such shifting means being adapted to maintain said heads in tandem relation along said irregular path on said surface traveled by said blowpipe means.

7. Apparatus for progressively welding or cutting a ferrous metal body and concurrently therewith heat-treating the portions affected by the welding or cutting operation, comprising blowpipe means for projecting a welding or flame-cutting jet downwardly against and progressively along the surface of the metal body; a plurality of heating heads spaced at successive substantial distances from said blowpipe means and adapted to apply local high-temperature heat to said surface at separated zones along the path of travel; and articulated connections between said respective heating heads, said connections providing relative transverse adjustment of said heads with respect to the path of travel.

8. Tandem heating head control means, adapted to maintain a plurality of relatively movable heating heads aligned in tandem relation along an irregular path of travel as said heads move over the surface of a workpiece, said control means comprising manually operable steering handle means; and connecting means operatively extending from said steering handle means to said respective relatively movable heating heads, said control means being adapted to control individually the position of said heads transversely of said path in accordance with the position of said steering handle means.

9. Apparatus for progressively welding or cutting a ferrous metal body and concurrently heat-treating the portions affected by the welding or cutting operation, comprising blowpipe means for projecting a welding or flame-cutting jet downwardly against and progressively along an irregular path on the surface of said metal body; a post-annealing head adapted to direct high-temperature heat against said surface at a point spaced from said blowpipe means, said head being adapted to reheat the portions affected by said blowpipe means to above the critical range; a post-tempering head spaced behind said post-annealing head and adapted to direct moderately high-temperature heat against said surface to reheat the portions treated by said post-annealing head to a point immediately below the critical range; and means for shifting said respective heads transversely of said path to maintain said heads in tandem relation along said path.

HOMER W. JONES.